United States Patent
Kwon et al.

(10) Patent No.: US 10,090,545 B2
(45) Date of Patent: Oct. 2, 2018

(54) STRUCTURE OF FUEL CELL SYSTEM AND CONTROLLING METHOD THEREOF

(71) Applicant: Hyundai Motor Company, Seoul (KR)

(72) Inventors: Hyuck Roul Kwon, Gyeonggi-do (KR); Kyoung Ku Ha, Gyeonggi-do (KR); Hyun Yoo Kim, Seoul (KR); Chang Ha Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 358 days.

(21) Appl. No.: 14/734,136

(22) Filed: Jun. 9, 2015

(65) Prior Publication Data

US 2016/0190616 A1    Jun. 30, 2016

(30) Foreign Application Priority Data

Dec. 31, 2014 (KR) .................. 10-2014-0195739

(51) Int. Cl.
*H01M 8/04* (2016.01)
*H01M 8/04746* (2016.01)
*H01M 8/04089* (2016.01)
*H01M 8/0438* (2016.01)

(52) U.S. Cl.
CPC ... *H01M 8/04753* (2013.01); *H01M 8/04089* (2013.01); *H01M 8/04097* (2013.01); *H01M 8/04395* (2013.01)

(58) Field of Classification Search
CPC .. H01M 8/04; H01M 8/0489; H01M 8/04753; H01M 8/0438; H01M 8/0476
See application file for complete search history.

(56) References Cited

U.S. PATENT DOCUMENTS

| | | | |
|---|---|---|---|
| 2002/0039672 A1 | 4/2002 | Aramaki | |
| 2004/0005228 A1* | 1/2004 | Agrawal | F04D 25/06 417/365 |
| 2004/0161647 A1* | 8/2004 | Rainville | H01M 8/04089 429/415 |
| 2014/0120440 A1* | 5/2014 | Nolan | H01M 8/04955 429/431 |
| 2015/0086894 A1 | 3/2015 | Ueda et al. | |

FOREIGN PATENT DOCUMENTS

| | | |
|---|---|---|
| JP | 2002-110213 A | 4/2002 |
| KR | 2006-0014159 A | 2/2006 |
| KR | 2014-0027733 A | 3/2014 |
| KR | 10-2014-0129738 A | 11/2014 |
| WO | 2013/157488 A1 | 10/2013 |

\* cited by examiner

*Primary Examiner* — Kenneth J Douyette
(74) *Attorney, Agent, or Firm* — Mintz Levin Cohn Ferris Glovsky and Popeo, P.C.; Peter F. Corless (57) ABSTRACT

A structure of a fuel cell system and a controlling method thereof are provided. The structure of the fuel cell system includes a flow sensor that is configured to detect a flow of air introduced into the fuel cell system and an air compressor that is configured to compress the introduced air and has an air foil bearing to maintain minimum driving revolutions per minute or greater. Additionally, the system includes a flow adjuster that is connected to the fuel cell system. Accordingly, since an amount of air corresponding to a required amount of air of the fuel cell system is supplied by limiting or recirculating an excessive air supply while securing durability and durability of abrasion of the air compressor to which the air foil bearing is applied, a dry phenomenon of the fuel cell system including a stack due to the excessive supply of air is prevented.

12 Claims, 8 Drawing Sheets

STRUCTURE OF FUEL CELL SYSTEM AND CONTROLLING METHOD THEREOF

CROSS-REFERENCE TO RELATED APPLICATION

This application is based on and claims the benefit of priority to Korean Patent Application No. 10-2014-0195739, filed on Dec. 31, 2014 in the Korean Intellectual Property Office, the disclosure of which is incorporated herein in its entirety by reference.

TECHNICAL FIELD

The present disclosure relates to a structure and method for stably driving an air compressor to which an air foil bearing used for a fuel cell system is applied, and more particularly, to a structure and method for limiting an excessive air supply of an air compressor used in a fuel cell system and a structure and method of the fuel cell system for recirculating excessively supplied air.

BACKGROUND

In general, since air is supplied to a fuel cell system, the fuel cell system includes an air compressor and a contact bearing such as a ball bearing has typically been used therein. However, since the contact bearing has a limit of revolutions per minute due to friction of the bearing, an air foil bearing has been increasingly used to overcome the limitation of the revolutions per minute of the compressor. Meanwhile, when the air foil bearing is used, a high speed driving may be implemented since the limitation of the revolutions per minute due to the bearing is not present, a size of the compressor may be reduced, and noise may be reduced due to a non-contact driving of the air compressor.

However, when an amount of air required by the fuel cell system is minimal, an air supplying amount is reduced while driving revolutions per minute (rpm) of a turbo-type compressor using the air foil bearing is decreased. In particular, when the driving revolutions per minute (rpm) of the air compressor using the air foil bearing becomes a lift-off revolutions per minute region or less, contact occurs between a rotor and the bearing, which causes abrasion and damage of a bearing surface, thus deteriorating durability of the air compressor. In addition, since load capacity of the bearing for the rotor of the compressor is decreased, damage risk of parts due to collision between the rotor which is rotated and the bearing or a housing at the time of an external impact is increased.

Meanwhile, when the driving revolutions per minute (rpm) is increased to the lift-off revolutions per minute or greater even though the required amount of air is minimal, since the air supplying amount is increased, a dry out phenomenon may occur in which a humidification amount required for the fuel cell system is insufficient and a membrane electrolyte assembly (MEA), or the like becomes dry.

SUMMARY

The present disclosure has been made to solve the above-mentioned problems occurring in the prior art while advantages achieved by the prior art are maintained intact.

An aspect of the present disclosure provide a structure and method of a fuel cell system, and a structure and method of limiting an excessive air supply of an air compressor applied to the fuel cell system, for purpose of securing driving stability of the fuel cell system including a compressor to which an air foil bearing may be applied.

According to an exemplary embodiment of the present disclosure, a structure of a fuel cell system may include: a flow sensor configured to detect a flow of air introduced into the fuel cell system; an air compressor configured to compress the introduced air and may include an air foil bearing to maintain minimum driving revolutions per minute or greater; and a flow adjuster connected to the fuel cell system.

In particular, the flow adjuster may be an exhaust pressure adjusting valve connected to the fuel cell system configured to adjust exhaust pressure and an air supply amount. When an amount of air supplied by the minimum driving revolutions per minute or greater of the air compressor exceeds an amount of air required by the fuel cell system, a degree of opening of the exhaust pressure adjusting valve may be adjusted.

The structure of the fuel cell system may further include a line configured to be supplied with air compressed by the air compressor and recirculate a portion of the compressed air, wherein the flow adjuster may be a bypass valve configured to recirculate excessively supplied air when an amount of air supplied by the minimum driving revolutions per minute or greater of the air compressor exceeds an amount of air required by the fuel cell system. When the amount of air supplied by the minimum driving revolutions per minute of the air compressor is the amount of air required by the fuel cell system or less, the air recirculation may be released by the bypass valve.

According to another exemplary embodiment of the present disclosure, a controlling method of a fuel cell system using the structure of the fuel cell system as described above may include: observing data of the air compressor of the fuel cell system; determining whether an idle rpm of the air compressor is a required rpm of the air compressor or greater after the data of the air compressor is observed; driving the idle rpm of the air compressor when the idle rpm of the air compressor is the required rpm of the air compressor or greater in the second operation; and decreasing a supply flow by adjusting a degree of opening of the exhaust pressure adjusting valve.

The controlling method may further include increasing the rpm of the air compressor and increasing the supply flow by opening the exhaust pressure adjusting valve when the idle rpm of the air compressor is less than the required rpm of the air compressor in the second operation.

According to another exemplary embodiment of the present disclosure, a controlling method of a fuel cell system using the structure of the fuel cell system as described above may include: observing (e.g., collecting) data of the air compressor of the fuel cell system; determining whether an idle rpm of the air compressor is a required rpm of the air compressor or greater after the data of the air compressor is observed; driving the idle rpm of the air compressor when the idle rpm of the air compressor is the required rpm of the air compressor or greater; detecting an open and close of the bypass valve; and increasing a recirculation flow by increasing an open value of the bypass valve at the time of the closing of the bypass valve.

The controlling method may further include increasing the open value of the bypass valve at the time of the opening of the bypass valve and detecting the open and close of the bypass valve when the idle rpm of the air compressor is less than the required rpm of the air compressor in the second operation.

In addition, the controlling method may further include increasing the supply flow by increasing the rpm of the air compressor when the bypass valve is closed and increasing the rpm of the air compressor, increasing the supply flow, and closing the bypass valve when the bypass valve is opened in the 6-1-th operation. The observed data of the air compressor may include the required rpm of the air compressor, the idle rpm of the air compressor, and a required amount of air and an actual amount of air of the fuel cell system.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure will be described in detail with reference to the accompanying drawings. Notably, the method as described herein below may be executed by a controller having a processor and a memory.

Figure 1:
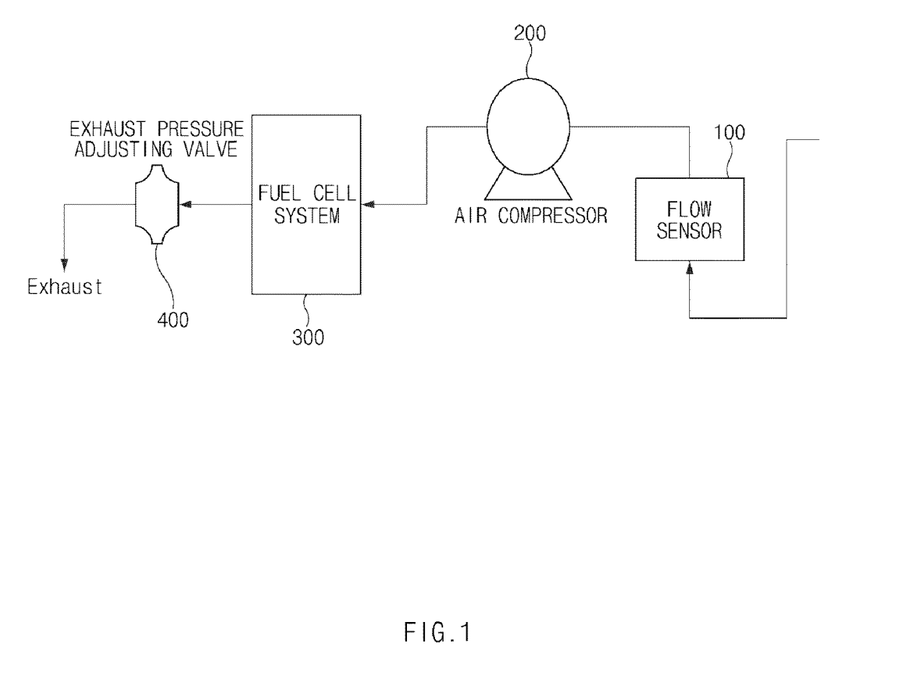
FIG. 1 is an exemplary structural diagram showing a structure of a fuel cell system according to an exemplary embodiment of the present disclosure.

A structure of a fuel cell system according to the present disclosure may include a flow sensor 100, an air compressor 200 having an air foil bearing, and a flow adjuster, which is an exhaust pressure adjusting valve 400, connected to the fuel cell system, as shown in FIG. 1. The flow sensor 100 may be configured to filter air introduced into the fuel cell system 300 and detect a flow of air. The air compressor 200 may be configured to compress the introduced air and may have the air foil bearing to allow minimum driving revolutions per minute to be maintained.

Meanwhile, the air foil bearing is one type of an air bearing, wherein when a shaft is sufficiently and rapidly rotated, a working fluid such as air pushes a foil from the shaft, to prevent contact between the shaft and the foil. In particular, the shaft and the foil may be lifted-off while being separated and supported by air having high pressure generated by a rotation by pushing air between the foil and the shaft by a viscosity effect.

In addition, the structure of the fuel cell system according to the present disclosure may be supplied with the air compressed by the air compressor 200 and may be configured to use the exhaust pressure adjusting valve 400 as the flow adjuster to be connected to the fuel cell system 300, thereby adjusting the air supply amount. When an amount of air supplied by the minimum driving revolutions per minute of the air compressor 200 exceeds an amount of air required by the fuel cell system 300, a degree of opening of the exhaust pressure adjusting valve 400 may be adjusted. In other words, when the amount of air supplied by the minimum driving revolutions per minute of the air compressor 200 is greater than the amount of air required by the fuel cell system 300, the air supply amount may be adjusted by changing the degree of opening of the exhaust pressure adjusting valve 400.

In the fuel cell system 300 according to the present disclosure in which the air compressor 200 using the air foil bearing is used, the minimum driving revolutions per minute of a turbo type compressor using an air foil may be driven at a minimum revolutions per minute rpm_min necessary to maintain load capacity capable of withstanding external impact. For example, the minimum RPM of the rotor may be determined by measuring a lift-off timing (which may be determined by measuring torque, a consumed current of a motor of the compressor, or the like) of a rotor and load capacity for each RPM and considering impact applied to the vehicle. Particularly, when the amount of air supplied by the minimum revolutions per minute of the air compressor 200 is greater than the amount of air required by the fuel cell system 300, the air supply amount may be adjusted by changing the degree of opening of the exhaust pressure adjusting valve 400.

Figure 6:
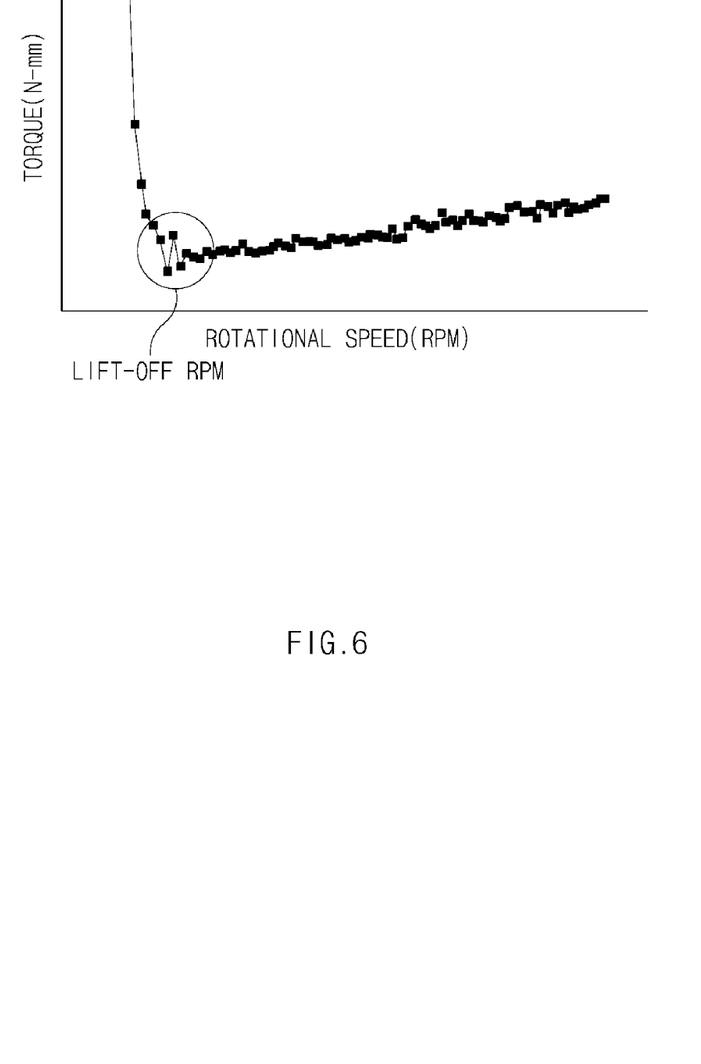
FIGS. 6 and 7 are exemplary graphs showing control states of an air supply amount of the structure of the fuel cell system according to an exemplary embodiment of the present disclosure.
Figure 7:
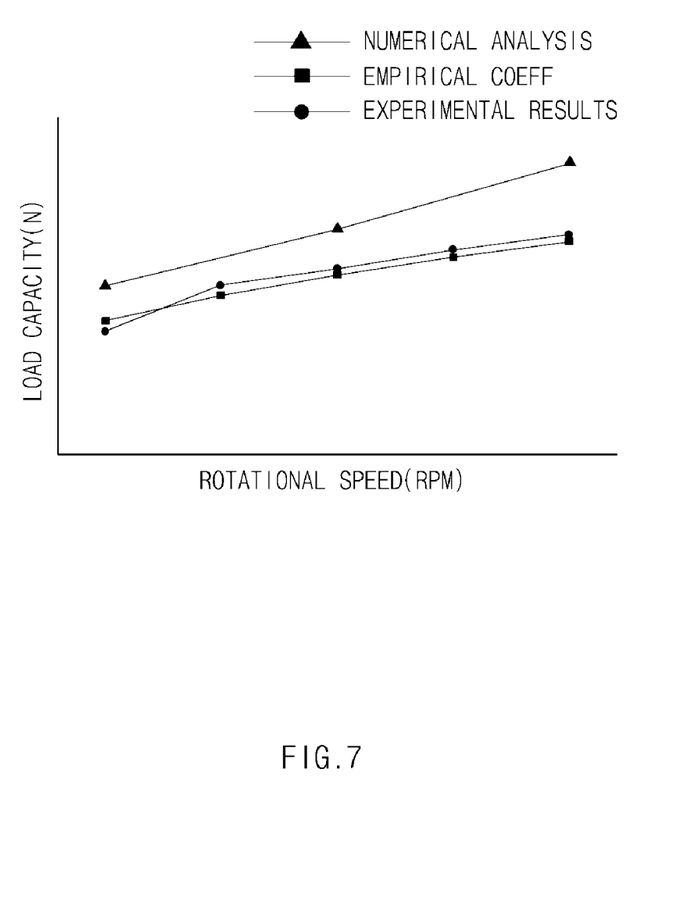

Meanwhile, as shown in FIGS. 6 and 7, when the rotor is lifted-off, torque applied to the shaft may be decreased while friction force generated by the contact is removed. In particular, revolutions per minute (RPM), which is the lift-off rpm or greater and may secure lowest load capacity capable of withstanding external excitation may be set as a lowest rpm (e.g., a minimum rpm). When the amount of air supplied by the lowest rpm is greater than the amount of air required by the fuel cell system 300, the air supply amount may be adjusted to meet the request of the fuel cell system 300 by closing (e.g., decreasing) the degree of opening of the exhaust pressure adjusting valve 400.

Figure 2:
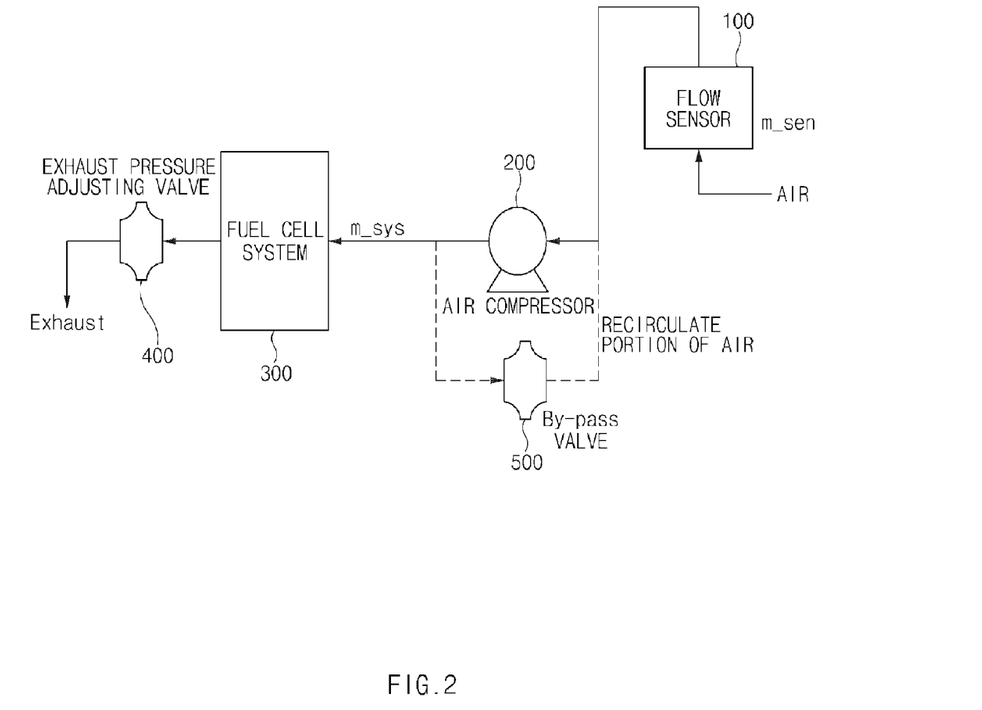
FIG. 2 is an exemplary structural diagram showing a structure of a fuel cell system according to another exemplary embodiment of the present disclosure.

Meanwhile, a structure of a fuel cell system according to another exemplary embodiment of the present disclosure may include a flow sensor 100 configured to detect a flow (e.g., a flow rate) of air introduced into a fuel cell system 300, an air compressor 200 configured to compress the introduced air and may include an air foil bearing to maintain minimum driving revolutions per minute, a line (not shown) supplied with the air compressed by the air compressor 200 and configured to recirculate a portion of the compressed air, and a flow adjuster, which may be a bypass valve 500, connected to the fuel cell system, as show in FIG. 2. In particular, when an amount of air supplied by the minimum driving revolutions per minute of the air compressor 200 exceeds an amount of air required by the fuel cell system 300, the bypass valve 500 may be configured to recirculate excessively supplied air.

Meanwhile, according to another exemplary embodiment of the present disclosure, the fuel cell system 300 may be supplied with the air compressed by the air compressor 200 and may be configured to recirculate the compressed air. Since the flow sensor 100, the air compressor 200, and the fuel cell system 300 are the same as those described above in the exemplary embodiment, an overlapped description thereof will be omitted.

Furthermore, the line (e.g., a communication line, passageway, or the like) may be supplied with the air compressed by the air compressor 200 and may be configured to recirculate a portion thereof. The bypass valve 500 may be configured to recirculate a portion of air from a rear stage of the air compressor 200 to a front stage of the air compressor 200 and recirculate the air by comparing an amount of air of the air compressor 200 and an amount of air required by the fuel cell system 300. In other words, when the amount of air supplied by the minimum driving revolutions per minute of the air compressor 200 is greater than the amount of air required by the fuel cell system 300, the bypass valve 500 may be opened to recirculate an excessively supplied flow, and when the amount of air supplied by the minimum driving revolutions per minute of the air compressor 200 is the amount of air required by the fuel cell system 300 or less, the bypass valve 500 may be closed to release the air recirculation.

Figure 3:
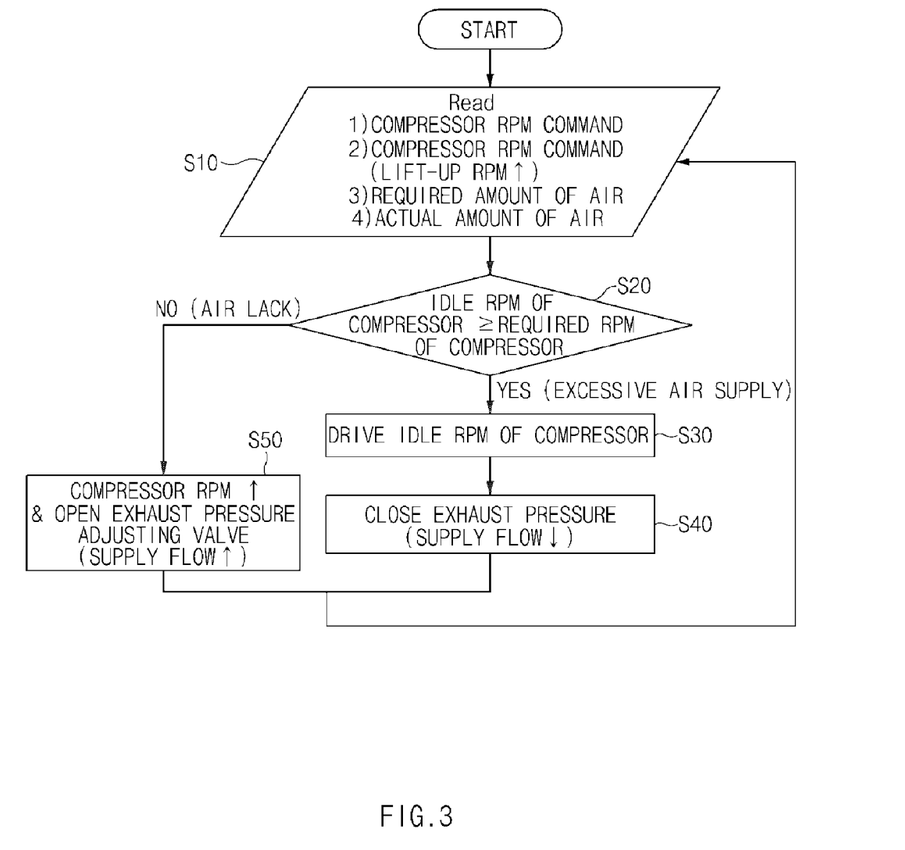
FIG. 3 is an exemplary flow chart showing a method of driving a fuel cell system according to an exemplary embodiment of the present disclosure.

A controlling method of a fuel cell system according to the present disclosure may include collecting (S10) data regarding an air compressor 200 of a fuel cell system 300, comparing and determining (S20) an idle rpm of the air compressor 200 and a required rpm of the air compressor 200, driving (S30) the idle rpm of the air compressor 200, and decreasing (S40) a flow by closing an exhaust pressure adjusting valve 400, as shown in FIG. 3.

In step S10, the data regarding the air compressor 200 of the fuel cell system 300 may be collected and may include the required rpm of the air compressor 200, the idle rpm of the air compressor 200, a required amount of air, and an actual amount of air. In step S20, the controller may be configured to determine whether the idle rpm of the air compressor 200 is the required rpm of the air compressor 200 or greater after the data of the air compressor 200 is collected in S10.

In step S30, when the idle rpm of the air compressor 200 is the required rpm of the air compressor 200 or greater in S20, the idle rpm of the air compressor 200 may be driven. In addition, in step S40, after the idle rpm of the air compressor 200 is driven in S30, a supply flow may be decreased by closing the exhaust pressure adjusting valve 400. Meanwhile, when the idle rpm of the air compressor 200 is less than the required rpm of the air compressor 200 in S20, the controller may be configured to increase (S50) the supply flow by increasing the rpm of the air compressor 200 and opening the exhaust pressure adjusting valve 400.

Figure 5:
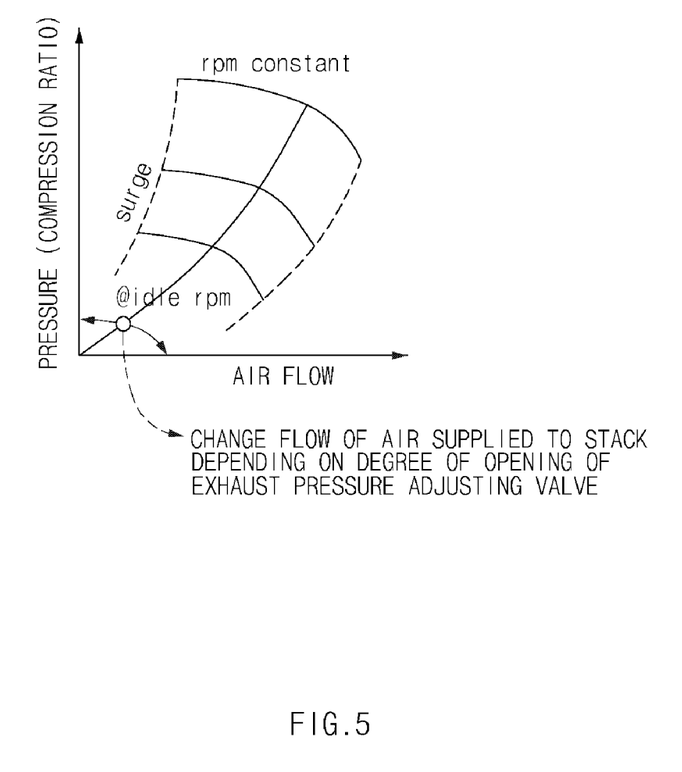
FIG. 5 is an exemplary graph showing a varying state of an air flow of a controlling method of a fuel cell system according to an exemplary embodiment of the present invention.

In other words, according to the present disclosure, as shown in FIG. 5, the flow of air supplied to the stack of the fuel cell system 300 may be adjusted based on the opening degree of the exhaust pressure adjusting valve 400 to supply an amount of air that corresponds to the required amount of air of the fuel cell system 300, thereby preventing a dry phenomenon of the fuel cell system 300 including the stack due to the excessive air supply and consequently, improving marketability and stability.

Figure 4:
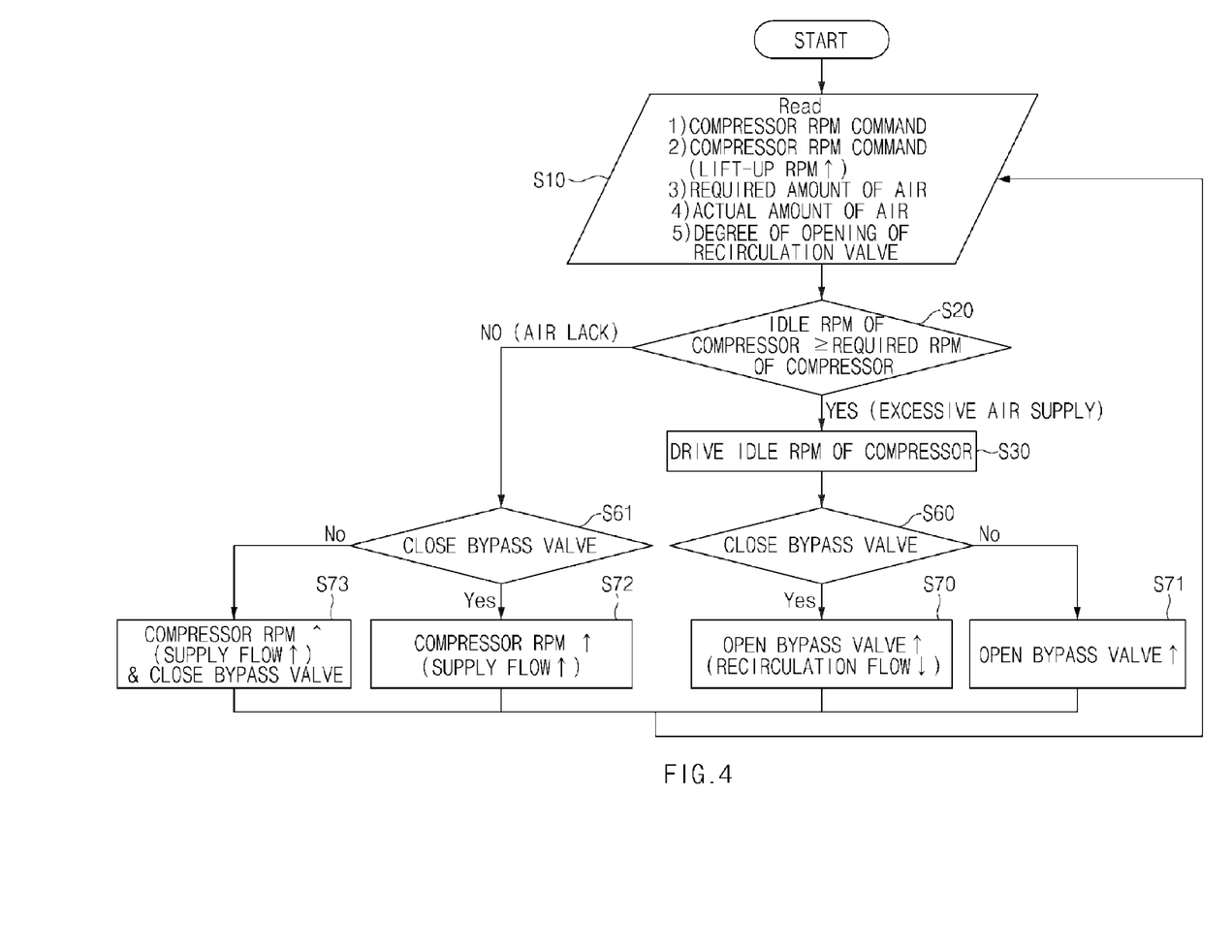
FIG. 4 is an exemplary flow chart showing a method of driving a fuel cell system according to another exemplary embodiment of the present disclosure.

In addition, a controlling method of a fuel cell system according to another exemplary embodiment of the present disclosure may include collecting (S10) data of an air compressor 200 of a fuel cell system 300, determining (S20) whether an idle rpm of the air compressor 200 is a required rpm of the air compressor 200 or greater after the data of the air compressor 200 is collected in S10, driving (S30) the idle rpm of the air compressor 200 when the idle rpm of the air compressor 200 is the required rpm of the air compressor 200 or greater in S20, detecting (S60) an open and close state of a bypass valve 500, and increasing (S70) a recirculation flow by increasing an open value (e.g., increasing an opening degree) of the bypass valve 500 during the closing of the bypass valve 500 in S60, as shown in FIG. 4.

Particularly, since the collecting of the data of the air compressor 200, the comparing and determining of the rpms, and driving of the idle rpm of the air compressor 200 are the same as those described above in the exemplary embodiment, an overlapped description thereof will be omitted. In t S60, after the idle rpm of the air compressor 200 is driven in S30, the open and close state of the bypass valve 500 may be detected. In S70, when the bypass valve 500 is closed, the recirculation flow may be increased by increasing the open value of the bypass valve 500 (e.g., increasing the opening degree). When the bypass valve is opened in S60, the method may further include increasing the open value of the bypass valve 500.

Meanwhile, when the idle rpm of the air compressor 200 is less than the required rpm of the air compressor 200 in S20, the method may include detecting (S61) the open and close state of the bypass valve 500. In particular, when the bypass valve 500 is closed in S61, the method may include increasing (S72) the supply flow by increasing the rpm of the air compressor 200.

Figure 8:
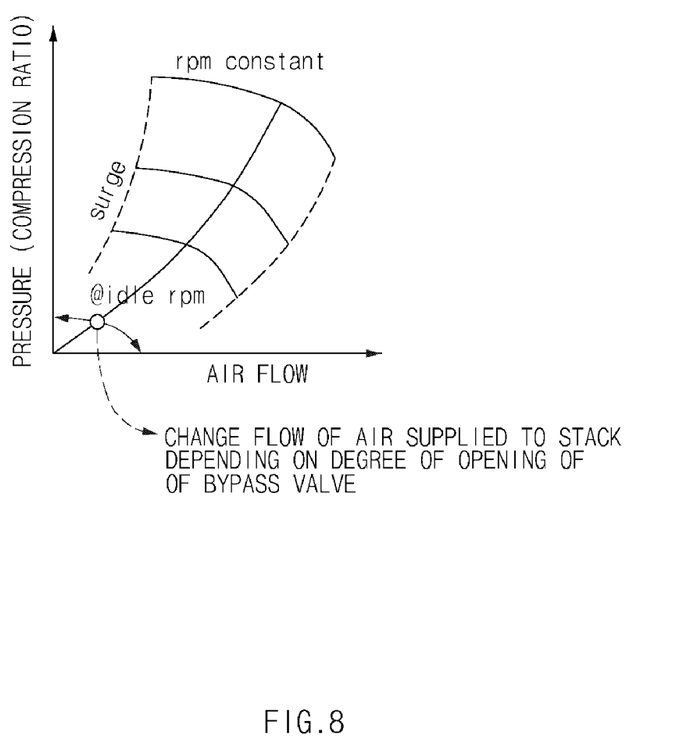
FIG. 8 is an exemplary graph showing a varying state of an air flow of a controlling method of a fuel cell system according to an exemplary embodiment of the present disclosure.

Additionally, when the bypass valve 500 is opened in S61, the method may include of increasing (S73) the rpm of the air compressor 200, increasing the supply flow, and closing the bypass valve 500. In other words, according to the present disclosure, as shown in FIG. 8, the flow of air supplied to the stack of the fuel cell system 300 may be adjusted based on the opening degree of the bypass valve 500 to supply an amount of air that corresponds to the required amount of air of the fuel cell system 300, thereby preventing a dry phenomenon of the fuel cell system 300 including the stack due to the excessive air supply and consequently, improving marketability and stability.

As described above, according to the exemplary embodiments of the present disclosure, since an amount of air that corresponds to the required amount of air of the fuel cell system may be supplied by limiting or recirculating the excessive air supply while securing durability and durability of abrasion of the air compressor to which the air foil bearing is applied, a dry phenomenon of the fuel cell system including the stack due to the excessive supply of air may be prevented, thereby making it possible to improve marketability and stability.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. A structure of a fuel cell system, comprising:
a flow sensor configured to detect a flow of air introduced into the fuel cell system;
an air compressor configured to compress the introduced air and having an air foil bearing such that a shaft and a foil are lifted-off when the shaft rotates at a lift-up revolutions per minute (rpm) or greater;
a flow adjuster connected to the fuel cell system; and
a controller configured to:
determine whether the lift-up rpm of the air compressor is a required rpm of the air compressor or greater;
drive the air compressor at the lift-up rpm when it is determined that the lift-up rpm of the air compressor is the required rpm of the air compressor or greater; and
adjust the flow adjuster to decrease a supply flow of the air to the fuel cell system when it is determined that the lift-up rpm of the air compressor is greater than the required rpm of the air compressor.

2. The structure of the fuel cell system according to claim 1, wherein the flow adjuster is an exhaust pressure adjusting valve connected to the fuel cell system and configured to adjust exhaust pressure and an air supply amount.

3. The structure of the fuel cell system according to claim 2, wherein the controller is configured to adjust an opening degree of the exhaust pressure adjusting valve when it is determined that the lift-up rpm of the air compressor is greater than the required rpm of the air compressor.

4. A controlling method of a structure of a fuel cell system, the controlling method comprising:
collecting, by a controller, data regarding an air compressor;
determining, by the controller, whether a lift-up revolutions per minute (rpm) of the air compressor is a required rpm of the air compressor or greater;
driving, by the controller, the air compressor at the lift-up rpm when it is determined that the lift-up rpm of the air compressor is the required rpm of the air compressor or greater;
adjusting, by the controller,
a flow adjuster to decrease a supply flow of the air to the fuel cell system when it is determined that the lift-up rpm of the air compressor is greater than the required rpm of the air compressor.

5. The controlling method according to claim 4, wherein the data regarding the air compressor includes the required rpm of the air compressor, the idle rpm of the air compressor, and a required amount of air and an actual amount of air of the fuel cell system.

6. A controlling method of a structure of a fuel cell system, the controlling method comprising:
collecting, by a controller, data regarding an air compressor of the fuel cell system;
determining, by the controller, whether a lift-up revolutions per minute (rpm) of the air compressor is a required rpm of the air compressor or greater;
driving, by the controller, the air compressor at the lift-up rpm when it is determined that the lift-up rpm of the air compressor is the required rpm of the air compressor or greater;
detecting, by the controller, an open and close state of a bypass valve that adjusts a recirculation flow from an outlet of the air compressor to an inlet of the air compressor; and
increasing, by the controller, the recirculation flow by increasing an open value of the bypass valve while closing of the bypass valve.

7. The controlling method according to claim 6, further comprising:
increasing, by the controller, the open value of the bypass valve while opening of the bypass valve.

8. The controlling method according to claim 6, further comprising:
detecting, by the controller, the open and close state of the bypass valve when the idle rpm of the air compressor is less than the required rpm of the air compressor.

9. The controlling method according to claim 8, further comprising:
increasing, by the controller, a supply flow of the air to the fuel cell system by increasing the rpm of the air compressor when the bypass valve is closed.

10. The controlling method according to claim 8, further comprising:
increasing, by the controller, the rpm of the air compressor and the supply flow, and closing, by the controller, the bypass valve when the bypass valve is opened.

11. The controlling method according to claim 6, wherein the data regarding the air compressor includes the required rpm of the air compressor, the idle rpm of the air compressor, and a required amount of air and an actual amount of air of the fuel cell system.

12. A structure of a fuel cell system, comprising:
a flow sensor configured to detect a flow of air introduced into the fuel cell system;
an air compressor configured to compress the introduced air and having an air foil bearing such that a shaft and a foil are lifted-off when the shaft rotates at a lift-up revolutions per minute (rpm) or greater;

a line configured to be supplied with air compressed by the air compressor and recirculate a portion of the compressed air;

a bypass valve disposed at the line and adjusting a recirculation flow through the line; and a controller configured to:
  determine whether the lift-up rpm of the air compressor is a required rpm of the air compressor or greater;
  drive the air compressor at the lift-up rpm when it is determined that the lift-up rpm of the air compressor is the required rpm of the air compressor or greater; and
  increase the recirculation flow by increasing an open value of the bypass valve.

* * * * *